US00RE41211E

(19) United States
(12) Reissued Patent
Tegler et al.

(10) Patent Number: US RE41,211 E
(45) Date of Reissued Patent: Apr. 6, 2010

(54) SYSTEM AT TELECOMMUNICATIONS NETWORK

(76) Inventors: Susanne Tegler, Rudeboksvägen 437, Lund 22655 (SE); Johan Wickman, Trädgardsvägen 21, Bjarred 237 35 (SE); Roger Bengtsson, Tornerstigen 11, Kaevlinge S-244 41 (SE)

(21) Appl. No.: 11/203,653

(22) PCT Filed: May 26, 1998

(86) PCT No.: PCT/SE98/00983

§ 371 (c)(1),
(2), (4) Date: Feb. 29, 2000

(87) PCT Pub. No.: WO98/56181

PCT Pub. Date: Dec. 10, 1998

Related U.S. Patent Documents

Reissue of:
(64) Patent No.: 6,606,481
Issued: Aug. 12, 2003
Appl. No.: 09/424,856
Filed: Feb. 29, 2000

(30) Foreign Application Priority Data

Jun. 5, 1997 (SE) ..... 9702146

(51) Int. Cl.
*H04H 7/00* (2006.01)

(52) U.S. Cl. ..... 725/63; 455/3.06; 455/4.2; 455/5.1; 455/3.05; 370/487; 348/E7.07; 348/487

(58) Field of Classification Search ..... 455/3.01, 455/3.02, 3.03, 3.04, 517, 5.1, 4.2; 370/487; 725/86, 87, 109
See application file for complete search history.

(56) References Cited

U.S. PATENT DOCUMENTS 5,394,559 A * 2/1995 Hemmie et al. ..... 725/73
5,437,052 A * 7/1995 Hemmie et al. ..... 725/131
5,459,506 A * 10/1995 Bushnell ..... 725/104
5,793,414 A * 8/1998 Shaffer ..... 725/114
5,812,930 A * 9/1998 Zavrel ..... 725/62
5,822,324 A * 10/1998 Kostresti et al. ..... 370/487
5,990,927 A * 11/1999 Hendricks et al. ..... 725/109

(Continued)

FOREIGN PATENT DOCUMENTS

DE 44 24 380 * 1/1996
GB 2 298 544 * 9/1996

OTHER PUBLICATIONS

Office Action issued on Jun. 26, 2002, by Examiner in U.S. Appl. No. 09/424,856 (U.S. Patent No. 6,606,481).
International Preliminary Examination Report issued Sep. 13, 1999 for PCT/SE98/00983.

*Primary Examiner*—Tan Trinh
(74) *Attorney, Agent, or Firm*—Foley & Lardner LLP

(57) ABSTRACT

A system provides interactive control of broadband services. There are today systems which offer distributive services, for instance analog cable-TV, analog satellites and acting terrestrial TV-networks. A paradigm shift, however, has been initiated in connection with that digital transmissions have started, which make possible a more spectrum efficient transmission. This means, for instance, that a broadband service such as digital transmission of video channels can be developed by making it interactive. One solution can be to use the GSM-system. For example, services which require low capacity in uplink can utilize the SMS-function is GSM. At larger demand of bandwidth GSM's data services can be utilized, which however prevents calls when the telephone is used for interactive communication. The invention solves this problem by interactive traffic between the transmitting and receiving equipment being managed by an interactive center (IC) which is arranged to execute wanted broadband service. IC in addition is in connection with a distributive centre (DC) for distribution of the broadband signals out on the telecommunications network.

25 Claims, 5 Drawing Sheets

U.S. PATENT DOCUMENTS 6,317,885 B1 * 11/2001 Fries ..... 725/109
6,529,493 B1 * 3/2003 Varin ..... 370/337
6,606,481 B1 8/2003 Tegler et al.
6,631,261 B1 * 10/2003 Farber ..... 455/432.1
2002/0073219 A1 * 6/2002 Kikinis ..... 709/231

* cited by examiner

SYSTEM AT TELECOMMUNICATIONS NETWORK

Matter enclosed in heavy brackets [ ] appears in the original patent but forms no part of this reissue specification; matter printed in italics indicates the additions made by reissue.

FIELD OF THE INVENTION

The present invention relates to a telecommunication network which provides interactive control of broadband services.

PRIOR ART

Today there are several systems which offer distributive services, for instance analog cable-TV networks, analog satellites and analog terrestrial TV networks. A paradigm shift, however, has begun in connection with that digital transmissions have started. Digital transmissions make possible more spectrum efficient transmissions, and that a more individual or target group directed content can be transmitted in a cost efficient way. A leading organisation concerning digital transmission is DVB (Digital Video Broadcast; cooperation between ETSI, EBU and CENELEC) which has produced specifications for transmission of MPEG-2-encoded data via satellite, terrestrial, cable, radio below 10 GHz and radio over 10 GHz. Another organisation with similar aim and direction is DAVIC, the work of which also includes protocol for ATM-transport.

A broadband service such as digital transmission of video channels can be developed by making it interactive. This means that the user can get access to functions such as selecting a film and wind or rewind the film. In addition to video-on-demand one may conceive other suitable interactive services, for instance training and shopping. Smallband interactivity is expected to be sufficient for a not unessential number of the users during a rather long time ahead.

One also should mention the very popular use of "web-browsers" over Internet. This type of service even today is interactive, but with a growing need of bandwidth, above all for downlink, i.e. towards subscriber.

Interactivity can be created in a number of different ways. The common, fixed telephone network, PSTN (Public Switched Telephone Network), can be utilized, which however implies that the operator has access to this. A problem just is that a Swedish operator in most cases lacks the possibility to act as an operator abroad.

Another problem with a PSTN-solution is that incoming and outgoing calls are prevented during the time when the line is used as an interactive channel, unless a separate line is not utilized.

One more problem with PSTN is that a changed paradigm for telephony can be observed, above all with the younger generation. It is expected to be more and more common that households do not acquire a fixed subscription but will be satisfied with one or more mobile telephone subscriptions.

The aim of the present invention consequently is to solve these problems.

SUMMARY OF THE INVENTION

This above mentioned aim is achieved by a system at a telecommunications network which provides interactive control of broadband services, at which said telecommunications network is a cellular, wireless, telecommunications network which is utilized as interactive control channel to said broadband services.

The invention consequently solves the problem of creating a narrowband interactive channel at low cost without, for instance, existing copper line needing to be utilized. The invention is an advantageous solution for persons who only has a mobile telephone subscription. The invention also gives an operator possibility to offer interactivity at low cost abroad, either themselves or in cooperation with a GSM-operator.

The services which are discussed will be utilized in the homes, where the main use is expected to be in the evenings and during holidays, i.e. during times when the GSM-network is not utilized at its full capacity, because of that the otherwise intensive use by companies then is limited. Services which require low capacity in uplink can make use of the SMS-function in GSM, which makes it possible to make or receive calls at the same time. At larger need of bandwidths, GSM's data services can be utilized, which however prevent incoming and outgoing calls when the telephone is used for interactive communication.

Further advantages are that the invention makes mobility possible in the sense that a customer can utilize a SIM-card to approve of orders and perform commands at just any terminal connected to the system.

The invention also makes possible a symmetric data channel if, for instance, a computer is connected to a set-top box.

Further embodiments and characteristics of the invention are given in the independent patent claims.

BRIEF SUMMARY OF THE DRAWINGS

In the following, detailed embodiments of the present invention are given with reference to the enclosed drawings, where.

DETAILED DESCRIPTION OF EMBODIMENTS OF THE PRESENT INVENTION

In the following, first a number of abbreviations which are used in the description will be explained. Then the invention will be described in principle with reference to FIG. 1. Preferred embodiments according to the FIGS. 2–5 after that will be discussed.

| | |
|---|---|
| BSC | Base Station Controller |
| BTS | Base Tranceiver Station |
| CA | Conditional Access |
| CLIP | Calling Line Identification Presentation |
| DC | Distributive Central |
| GPRS | General Packet Radio Service |
| GSM | Global System for Mobile Communications |
| HSCSD | High Speed Circuit-Switched Data |
| MCS | Mobile Switching Center |
| PIN | Personal Identification Number |
| PSTN | Public Switched Telephone Network |

-continued

| | |
|---|---|
| IC | Interactive Central |
| SMS | Short Message Service |
| STB | Set Top Box |

The cellular wireless communication network which is utilized in the embodiments especially relates to GSM. It should of course be realized that in principle just any cellular wireless communications system can be used.

By GSM is meant in the embodiments digital cellular mobile telephone systems such as GSM, DCS-1800, PCS-1900, IS-95, PDC, D-AMPS and corresponding. Further are related to cellular short distance systems such as DECT, PHS and PACS. Future cellular third generation system such as UMTS, FPLMTS also are related to.

By broadband service is meant a type of larger information transmission to a user, for instance transmission of a video film. We regard a service as broadband when the transmission rate is 2 Mbit/s or higher. The broadband service can, as has been mentioned above, for instance be distributed according to DVB's specifications for satellite, cable etc, or corresponding DAVIC specifications.

In the description below, the conception set-top-box (STB) is used. By this conception is related to a stand-alone equipment which at the user converts the incoming broadband signal to a signal which is adapted to the TV, the computer etc.

A broadband service such as digital transmission of video channels, in a simple and cheap way can be made interactive by utilizing the existing GSM-network. The subscriber can achieve interactivity in three different ways:

1. Set-top-box with SIM-card reader and built-in radio equipment for GSM. This alternative is primarily aimed at subscribers who do not have access to a mobile telephone (see FIG. 2).
2. Set-top-box without built-in radio equipment for GSM, but with connection for an external mobile telephone (see FIGS. 3, 4).
3. Separate GSM-telephone which functions as a remote control (see FIG. 5).

Figure 1:
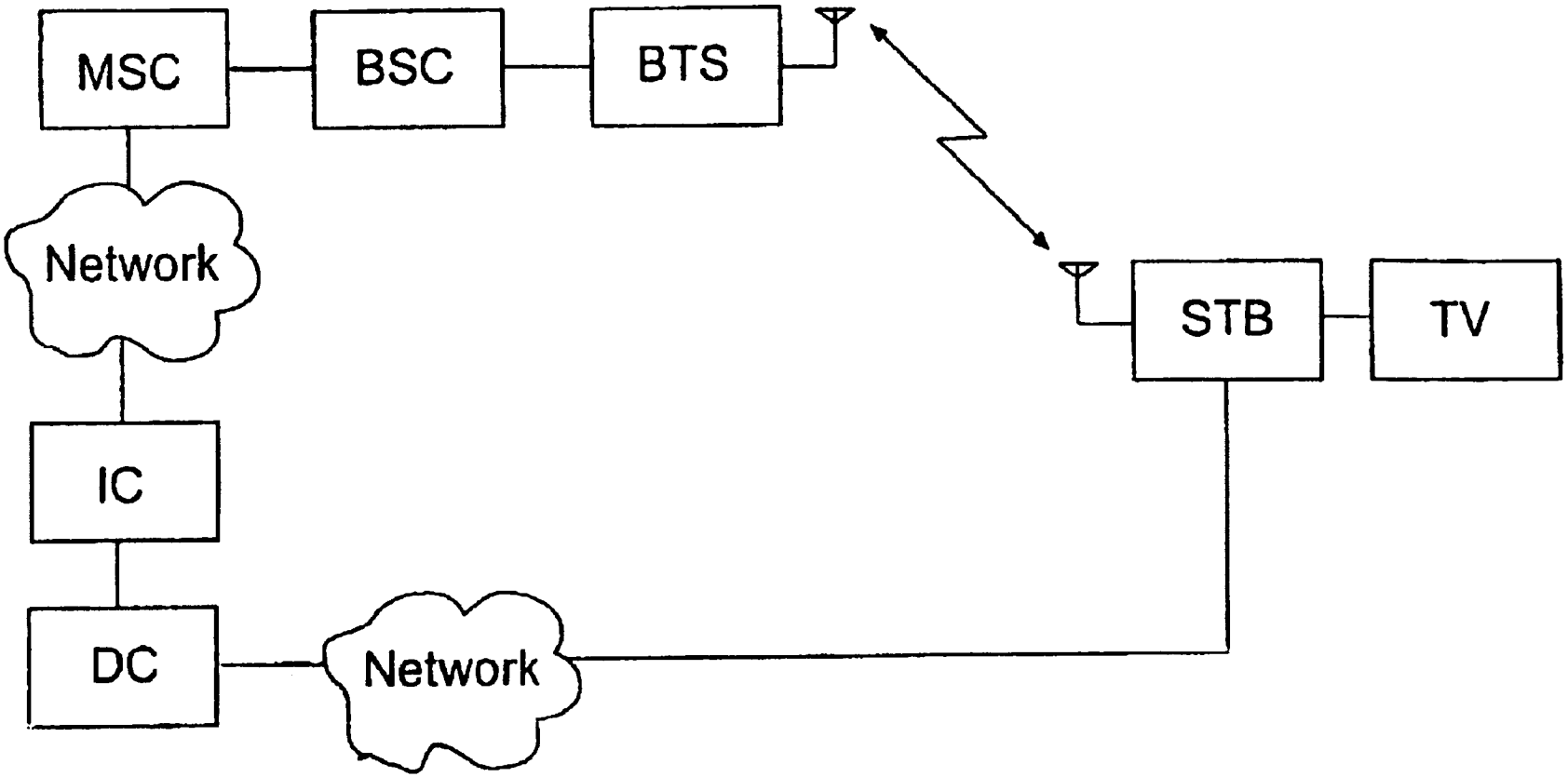
FIG. 1 is a diagrammatic survey of the system according to the invention.
Figure 2:
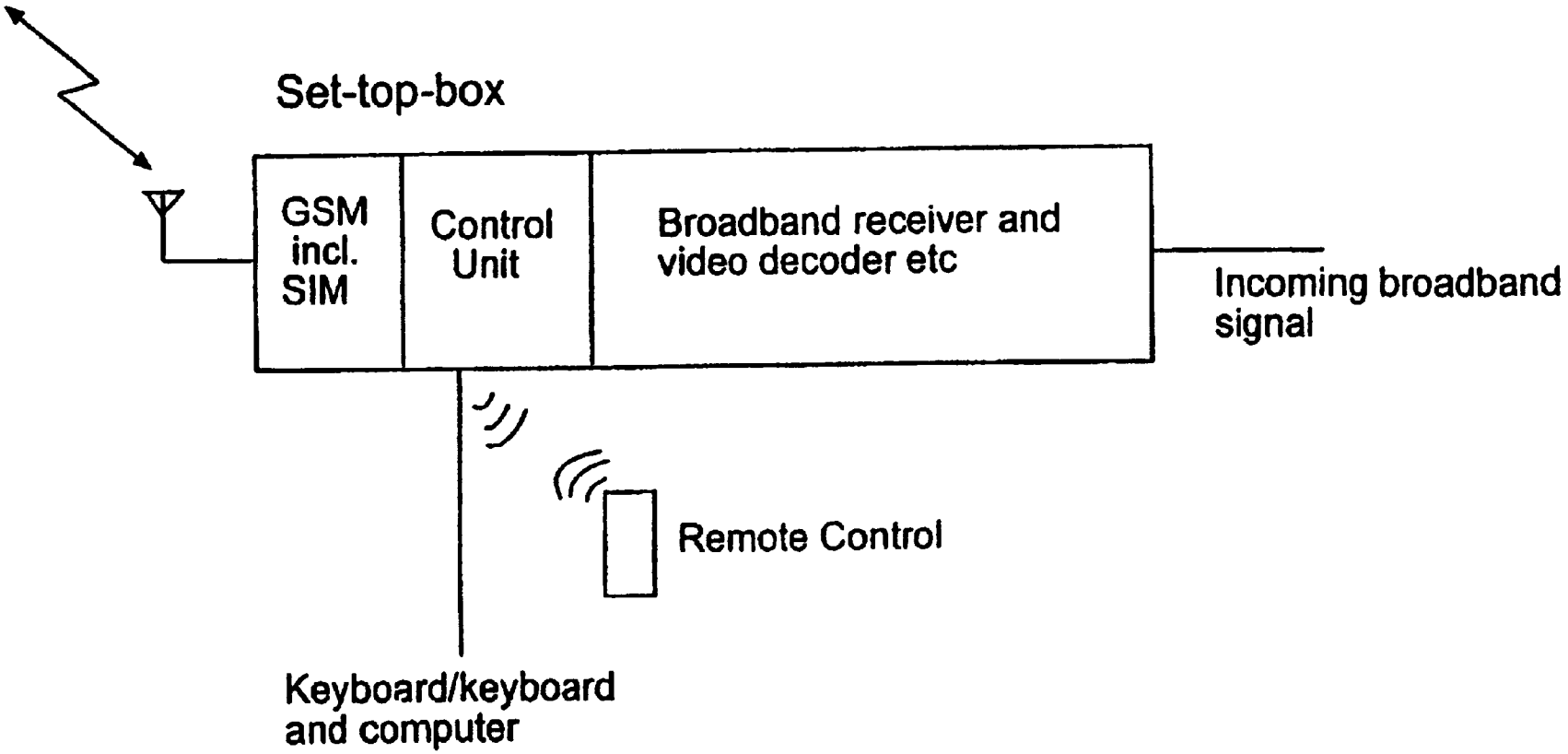
FIG. 2 is a first embodiment of how a subscriber can achieve interactivity by means of the system in FIG. 1.
Figure 3:
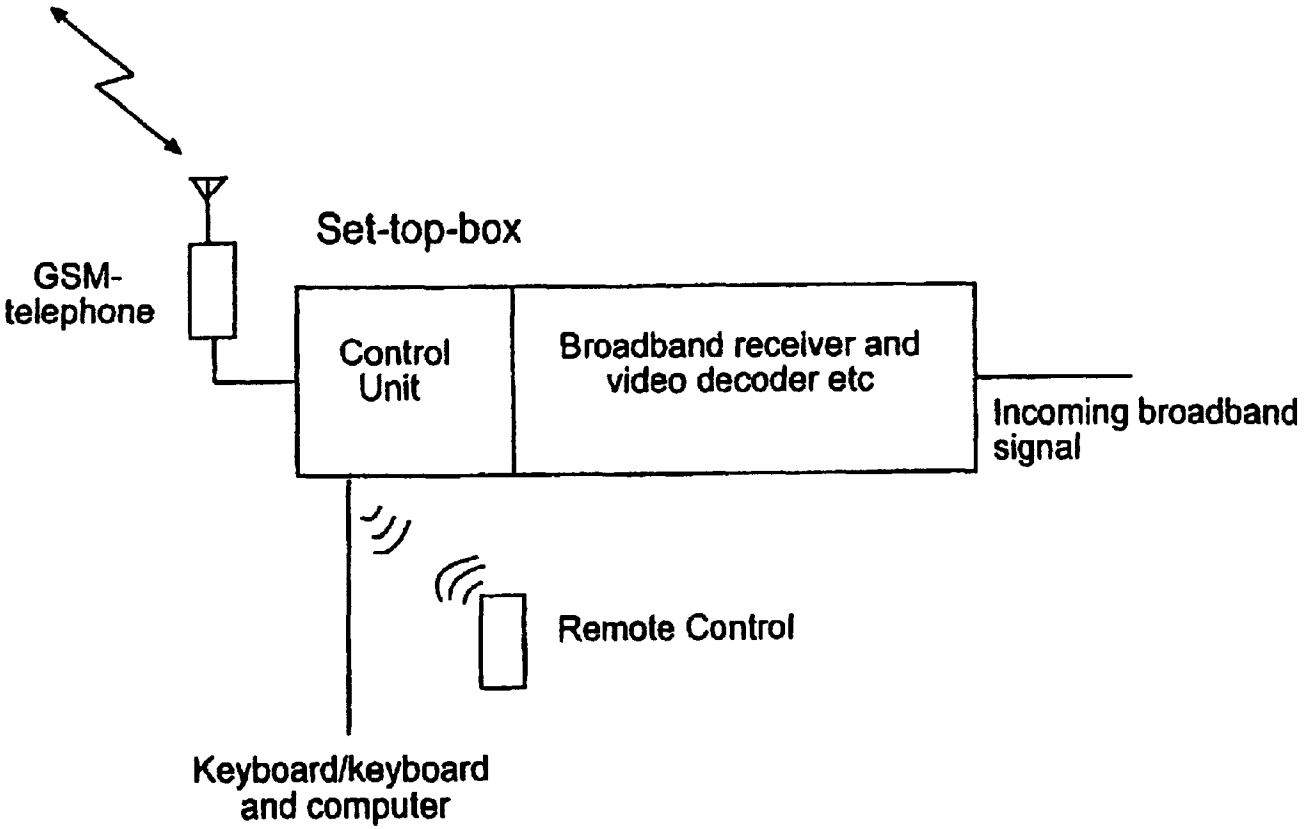
FIG. 3 is a second embodiment of how a subscriber can achieve interactivity by means of the system in FIG. 1.

The interactive traffic between STB or GSM-telephone and BTS passes via BSC, MSC and a network to an interactive centre IC, (see FIG. 1). IC communicates with a distributive central, DC, which provides broadband services, for instance video-on-demand etc. IC consequently receives interactive instructions from STB or mobile telephone, which instructions are recoded and transmitted to DC. DC then transmits broadband services corresponding to said instructions via networks to the STB as can be seen in FIG. 1. In, for instance, FIG. 2 is shown that the incoming broadband signal is received by the video decoder in the STB. The STB after that converts the broadband signal to a signal which can be received by for instance the TV.

For transmission of interactive data in downlink to customer, both the broadband broadcast channel and GSM's downlink can be utilized. Selection can be made depending on type of data. For instance, DBV is at present producing protocols for data broadcast which makes possible for the set-top-box to find data information in the broadcast channel.

By using the GSM-network as interactive channel for distributive services, the network is utilized at times in the 24 hour periods when the load normally is low. The need of an expensive extension or new built-up of an interactive network for broadband services can by that initially be reduced or avoided.

If the GSM-subscription in this way is utilized, for instance, to order a film, the cost for this then can be debited the customer on the GSM-invoice. At shopping-on demand, the customer in the same way can be debited via the mobile telephone invoice. This means that the SIM-card is utilized as a credit card.

Another possibility is to connect the SIM-card to an ordinary credit card which the customer has. This means that the responsibility to transmit money is laid on the credit company at for instance shopping-on-demand. GSM also can be used as CA-system (Conditional Access), because GSM supports encryption, authenticating and PIN (Personal Identification Number).

In the embodiment in FIG. 2, the set-top-box contains radio equipment for a GSM-terminal and a SIM-card reader. The SIM-card reader should be adapted so that both the large and small version of SIM-cards fit.

The radio equipment in principle can be simplified because the STB is stationary, and parts such as channel equalizer and channel encoder can be excluded, or at least be simplified.

The communication between user and set-top-box is done by remote control or keyboard. The keyboard either can be directly connected to the set-top-box or connected via a computer.

The customers who do not have a GSM mobile telephone subscription should be offered a subscription which is adapted to the interactive channel. As added value this SIM-card also should be possible to use for conventional mobile telephony.

The users who already have a mobile telephone can utilize a set-top-box, which lacks radio equipment, and instead utilize the mobile telephone. The set-top-box then neither need to contain a SIM-card reader. The mobile telephone is connected to the set-top-box by means of a cable and possibly also a PC-card (see FIG. 3).

Utilization of a standardized interface is desirable. This makes possible that only the cable need to be changed if the subscriber changes mobile telephone model.

The communication between customer and set-top-box is executed by means of remote control or keyboard. The keyboard can either be directly connected to the set-top box, or be connected via a computer.

Figure 4:
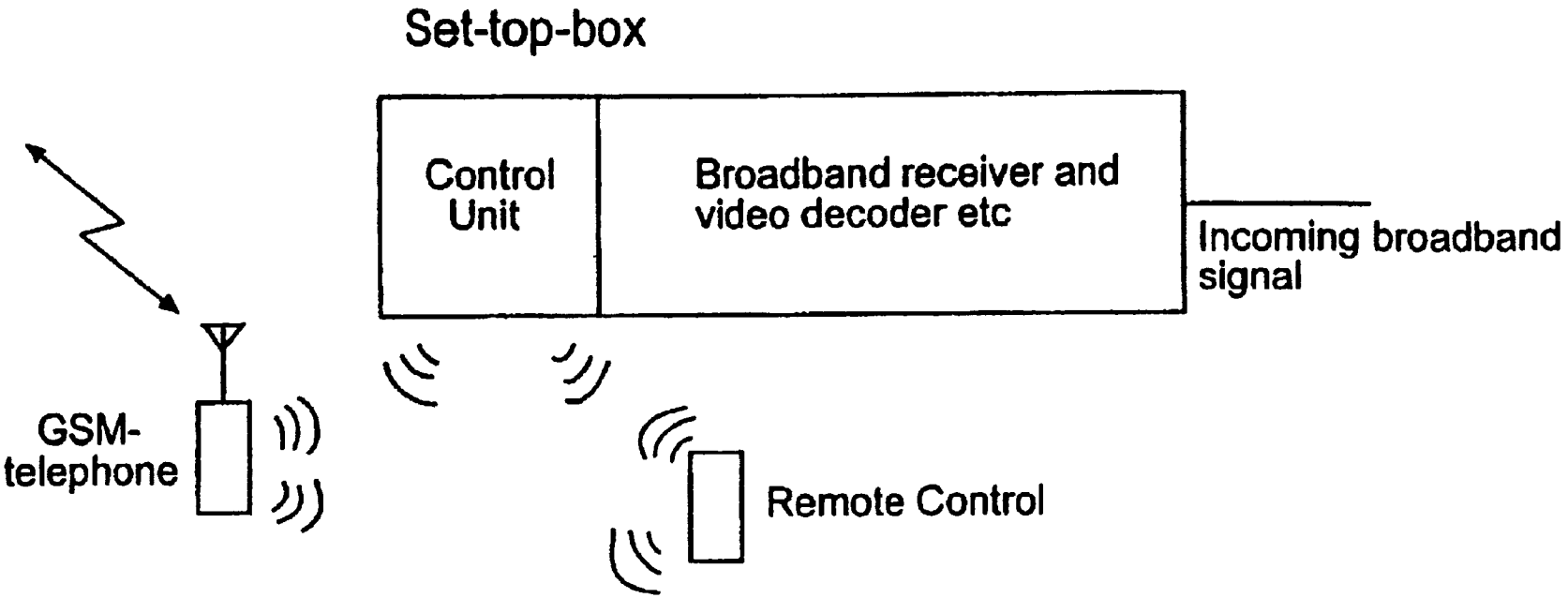
FIG. 4 is a third embodiment of how a subscriber can achieve interactivity by means of the system in FIG. 1.

In an alternative embodiment of the invention an IR-based remote control is utilized to control TV, STB and GSM-telephone (see FIG. 4). In this embodiment an IR interface is connected or integrated to, or in, the GSM-telephone. The IR-based interface consequently can be used as connection between the GSM-telephone and STB. The invention includes the STB and GSM can communicate via IR directly or via remote control.

The above construction implies a simplified connection of the GSM-telephone for the user.

It should be noticed that the IR-technology which is included in the invention can be either:

directive (today's normal IR-technology, one has to "point" with the remote control), or diffuse. The diffuse IR-technology will probably be of great importance in the future. Diffuse IR results in that the user need not point "in correct direction" because the IR-communication in this case is omnidirectional and utilizes reflections in walls and other objects in the close neighbourhood.

Figure 5:
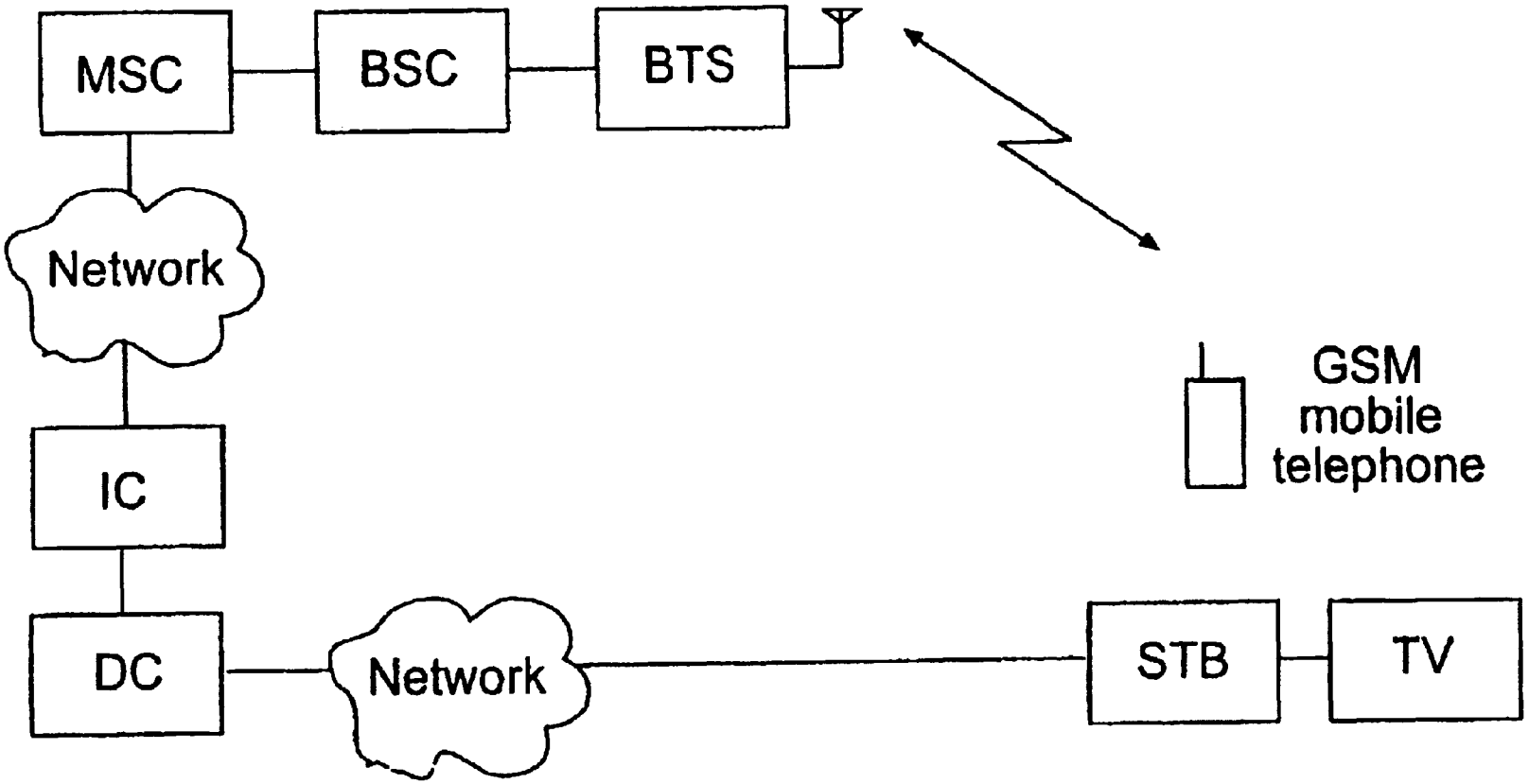
FIG. 5 shows the system according to FIG. 1 where a GSM-telephone handles the interactive communication, independent of an STB.

In FIG. 5 is shown a GSM-portable which is not connected to the set-top-box, but yet is utilized to effect an interactive channel. By transmitting a data sequence to the interactive centre (IC) via BTS etc. the user can control the broadband channel is downlink. This solution does not make possible the same automaticity but requires that the customer himself/herself attends to that correct sequence and number is dialed.

No communication related to the interactive services is executed in this case between the mobile telephone and the set-top-box, but via the GSM-telephone and the IC. The user in this case acts as interface between the mobile telephone and for instance the TV-screen.

The communication channels (carries services) below are related to GSM. The corresponding carrier services can be utilized in the above mentioned system.

Interactive channel via SMS

A small amount of information can be transmitted as messages via SMS. In order to get a faster communication a separate SMS-SC can be created for the service. SMS-SC in this case is the interactive centre.

Interactive channel via ordinary circuit switched connection

A circuit switched connection should be used when higher capacity is required than the one at SMS. In present standard issue (phase 2) data services with a rate of max. 9.6 kbit/s are supported.

Interactive channel via GPRS

In the work with GSM phase 2+ the standardization of packet switched data transmission is going on to support an efficient transmission of traffic in bursts. GPRS is expected to support instantaneous data rates at up to about 100 kbit/s. The GPRS-standard is expected to be ready in 1998 with an expected introduction on the market one or two years later.

Interactive channel via HSCSD

In order to support circuit switched data services with higher data rate, there are in the phase 2+-work produced specifications which will support up to 64 kbit/s. The HSCSD-standard will be ready in 1997 with an expected introduction on the market one to two years later.

The interactive centre, IC, can be located with the one who offers the distributive service. IC must be in connection with the distribution centre, DC, which can be physically located together. CLIP can be used to identify calling party.

As has previously been mentioned, the invention can be used to create an interactive channel to broadband services, for instance video-on-demand and high speed internet access. The invention in addition can be of great importance at markets where the operator does not in a simple way has at his/her disposal a fixed access network, PSTN. The invention also can be used as a complement for subscribers who are lacking a fixed subscription or do not want to utilize the fixed subscription.

The invention consequently offers an extended field of application of GSM-telephones och GSM-systems, which may contribute to increasing revenues and that repayment of the big investments which are made in the GSM-system will be made faster. The coming extension of GSM in the 1800 MHz-band (DCS1800), in addition probably will make possible extended fields of use for GSM thanks to the heavily increased capacity which is set free.

The above mentioned is only to be regarded as advantageous embodiments of the invention, and the extent of protection of the invention is only defined by what is indicated in the following patent claims.

What is claimed is:

1. A system for filling subscriber orders for broadband services to be received by a broadband receiver at a subscriber station, the system comprising:

a base station configured to communicate with the subscriber's station to receive said subscriber orders for broadband services therefrom; and a central control and distribution unit configured to communicate with the base station and to provide broad band services to the broadband receiver at the subscriber station on a broad band network not associated with the base station, said broad band services being provided in accordance with said subscriber orders for broadband services relayed from the base station after receipt from the subscriber station, said subscriber station including, a global system for mobile communications (GSM) unit including an SIM card unit and GSM radio equipment configured to communicate with the base station, and a control unit configured to communicate with a subscriber order input device providing said subscriber orders for broadband services and to forward said subscriber orders for broadband services to the GSM unit to be relayed to the base station by the GSM radio equipment in the GSM unit, wherein the [SPA] *SIM*-card unit is configured to debit an associated SIM-card for the value of the broadband services included in said subscriber orders for broadband services.

*2. A system, comprising:*

*a base station configured to communicate with a subscriber station to receive a subscriber order for broadband service, wherein the subscriber station comprises a subscriber identity module (SIM) card and wireless communications equipment configured to provide the subscriber order to the base station, and wherein the SIM-card is used to facilitate a payment for the broadband service; and*

*a central control and distribution unit configured to communicate with the base station and to provide the broadband service to the wireless communications equipment at the subscriber station.*

*3. The system of claim 2, wherein the wireless communications equipment provides the subscriber order to the base station using one or more of a short message service (SMS) based communication message, a general packet radio service (GPRS) based communication message, and a high speed circuit-switched data (HSCSD) based communication message.*

*4. The system of claim 2, wherein the SIM-card is associated with a credit card, and further wherein the credit card is used to make the payment for the broadband service.*

*5. The system of claim 2, wherein the SIM-card is used to implement a debit for the payment for the broadband service.*

*6. The system of claim 5, wherein the debit is made through an invoice for wireless communication services provided to the subscriber station.*

*7. The system of claim 2, wherein the subscriber station comprises a set top box and a mobile telephone in communication with the set top box.*

*8. A method for providing broadband services comprising:*

*receiving a request for a broadband service, wherein the request originates from a subscriber station having a wireless communications unit and a control unit coupled to the wireless communications unit, and further wherein the request is received through a wireless communications network having at least one base station;*

*providing the broadband service to the subscriber station; and*

*receiving a payment for the broadband service, wherein the payment is facilitated with a subscriber identity module (SIM) card associated with the subscriber station.*

*9. The system of claim 8, wherein the request for the broadband service is received from the at least one base station.*

*10. The system of claim 8, wherein the SIM-card is associated with a credit card, and further wherein the payment for the broadband service is received from a credit card company.*

*11. The system of claim 8, wherein the SIM-card is used to debit for the payment for the broadband service.*

*12. A method for obtaining broadband services comprising:*

*providing a request for a broadband service to a base station in communication with a central control and distribution unit, wherein the request is provided through a wireless communications network;*

*receiving the broadband service at a subscriber station; and*

*providing a payment for the broadband service, wherein the payment is facilitated with a subscriber identity module (SIM) card associated with the subscriber station.*

*13. The method of claim 12, wherein the broadband service comprises a video.*

*14. The method of claim 13, further comprising providing the video from the subscriber station to a television or to a computer.*

*15. The method of claim 12, wherein the SIM-card is associated with a credit card, and further wherein the credit card is used to make the payment for the broadband service.*

*16. The method of claim 12 wherein the SIM-card is used to implement a debit for the payment for the broadband service, and further wherein the debit is implemented through an invoice for wireless communication services provided to the subscriber station.*

*17. A subscriber station for receiving broadband services, the subscriber station comprising:*

*wireless communications equipment configured to*

*send a request for a broadband service to a central control and distribution system through a wireless communications network; and*

*receive the broadband service from the central control and distribution system; and*

*a subscriber identity module (SIM) card used to facilitate payment for the broadband service.*

*18. The subscriber station of claim 17, wherein the subscriber station comprises a set top box.*

*19. The subscriber station of claim 17, wherein the subscriber station comprises a mobile telephone.*

*20. The subscriber station of claim 17, wherein the subscriber station comprises a set top box in communication with a mobile telephone.*

*21. The subscriber station of claim 17, wherein the broadband service comprises a video.*

*22. The subscriber station of claim 21, further comprising a video decoder configured to convert a received broadband signal into the video.*

*23. The subscriber station of claim 17, wherein the SIM-card is associated with a credit card, and further wherein the credit card is used to make the payment for the broadband service.*

*24. The subscriber station of claim 17, wherein the SIM-card is used to implement a debit for the payment for the broadband service.*

*25. The subscriber station of claim 24, wherein the debit is made through an invoice for wireless communication services provided to the subscriber station.*

* * * * *

UNITED STATES PATENT AND TRADEMARK OFFICE

CERTIFICATE OF CORRECTION

PATENT NO. : RE 41,211 E
APPLICATION NO. : 11/203653
DATED : April 6, 2010
INVENTOR(S) : Susanne Tegler, Johan Wickman and Roger Bengtsson It is certified that error appears in the above-identified patent and that said Letters Patent is hereby corrected as shown below:

Column 7, line 1, delete "The system of claim 8" and insert --The method of claim 8--

Column 7, line 4, delete "The system of claim 8" and insert --The method of claim 8--

Column 7, line 8, delete "The system of claim 8" and insert --The method of claim 8--

Signed and Sealed this

Thirteenth Day of July, 2010

David J. Kappos

David J. Kappos
*Director of the United States Patent and Trademark Office*